(No Model.)
B. A. FISKE.
ELECTRICAL RANGE FINDER.
No. 444,217. Patented Jan. 6, 1891.
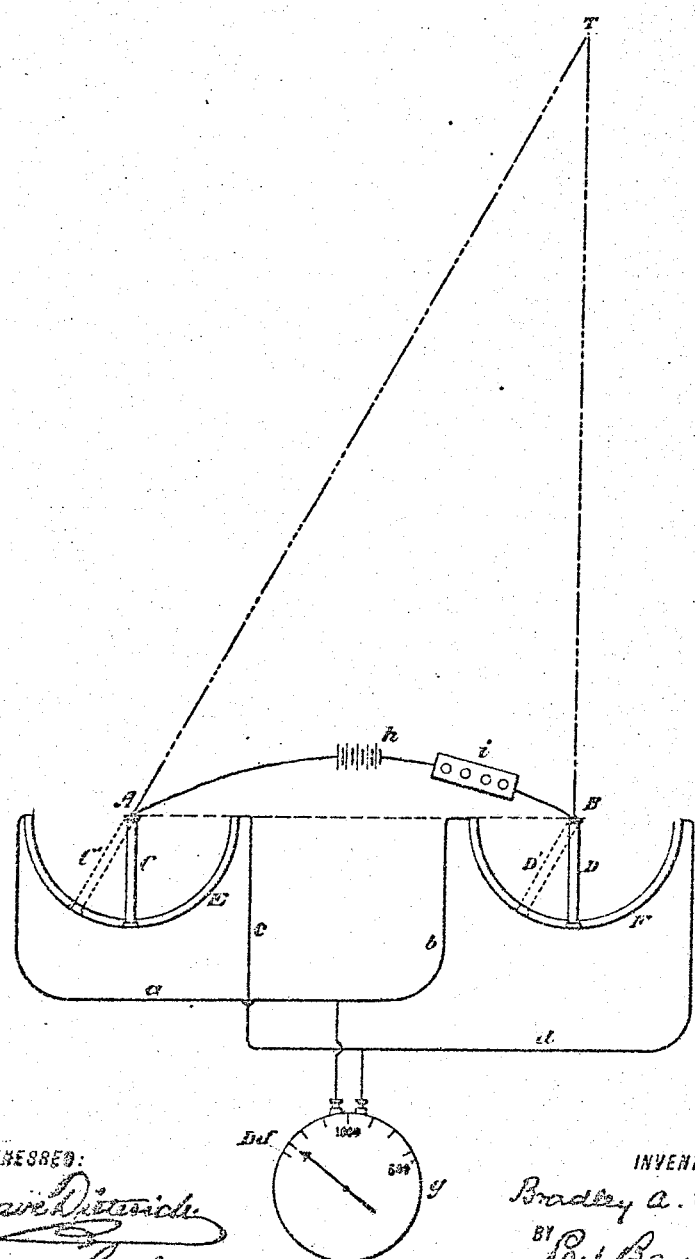
WITNESSED:
Gustave Dietrich
William Goebel
INVENTOR
Bradley A. Fiske
BY Carl Benjamin
his ATTORNEY.

UNITED STATES PATENT OFFICE.

BRADLEY ALLAN FISKE, OF THE UNITED STATES NAVY.

ELECTRICAL RANGE-FINDER.

SPECIFICATION forming part of Letters Patent No. 444,917, dated January 6, 1891.

Application filed June 25, 1890. Serial No. 356,678. (No model.)

*To all whom it may concern:*

Be it known that I, BRADLEY ALLAN FISKE, of the United States Navy, have invented a new and useful Improvement in Range-Finders, of which the following is a specification.

My invention relates to a method and apparatus for determining the distance or range of far-off objects; and it consists, broadly, in determining a fractional portion of a conducting-body bearing in length a ratio to the angle included between two lines of sight directed upon a distant object and simultaneously causing a disturbance in an electrical balance including said body in its circuit proportional to the resistance of said fractional portion and observing the difference in potential due to said disturbance, and also in an apparatus whereby my said method is carried into practical effect, which apparatus consists substantially in two bodies of conducting material similarly disposed with reference to a predetermined base-line, alidade-arms establishing and maintaining contact with said bodies, and an electrical measuring-instrument constructed to measure differences in electrical potential, said instrument being provided with an index and a scale marked in units of linear measure, and the aforesaid parts being connected in electrical circuit.

The figure of the drawing represents a diagram illustrating the use of my improved range-finder.

Referring to the figure, let AB be a base-line and T the position of a distant object, the range of which AT is to be determined by trigonometry. In the triangle ATB, $$AT = \frac{AB \times \sin ABT}{\sin ATB}$$

Let C and D represent two telescopes or alidade-arms pivoted at the points A and B and sweeping over arcs E and F of conducting material, the said arcs having their extremities upon the base-line AB. Let the telescope C be directed upon the point T, assuming the position represented by C', dotted lines. Then, obviously, the angle C'AC is equal to the angle ATB, and the portion of the arc E included between the positions C and C' of the telescope will measure the angle ATB.

In the foregoing formula the base-line AB is known by measurement and the angle ABT may be observed, and if the angle ABT is, as shown in the figure, a right angle, then the sin ABT becomes unity. It remains, therefore, to find the angle ATB in order to determine the distance AT, so that it becomes necessary to provide a simple and rapid means of at once determining what the angle ATB is. To this end I connect the arcs E F of conducting material in a Wheatstone bridge, the four members of which are shown respectively at $a\ b\ c\ d$. In this bridge I connect a galvanometer $g$ in the usual way, and also the battery $h$, the terminals of the battery-wire being connected to the telescopes at their pivot-points A B, so that the circuit proceeds through the telescopes to the arcs, and then at the arc F divides through the wires $b\ d$ and at the arc E divides through the wires $a\ c$. It will be plain that when the two telescopes C and D stand at right angles to the base line, and hence parallel one to the other, the bridge will balance and the galvanometer will show no deflection. The line of sight of the two telescopes then being parallel, the galvanometer will then indicate infinite range; and of course this will be true no matter where the telescopes may be on their respective arcs, so long as their lines of sight are relatively parallel. But if one telescope be moved out of parallelism with the other—as, for example, the telescope C moved to the position C'—then clearly the bridge will be thrown out of balance and the galvanometer will be deflected. It will also be clear that the extent of deflection of the galvanometer will depend upon the length of arc included between the two positions of the telescope C C', and will be greater as that arc increases, so that with a battery with constant electro-motive force it becomes possible to determine the extent of movement of the telescope C by simply observing the indication of the galvanometer. It will of course be obvious that, as the angle between the positions C and C' of the telescope increases, the length of the line AT will constantly decrease, while the deflections of the galvanometer will constantly increase, so that the galvanometer indicates ranges starting from infinity when the galvanometer shows no deflection, small ranges being indicated by large deflections of the galvanometer, and vice versa. As a matter of convenience, I prefer to employ for this purpose a galvanometer so constructed that the deflections of the index will be proportional to the difference of potential at the terminals. Instruments of this type are well known in the art and need no special description here.

It will be clear that by the foregoing means I have reduced the operation of finding the range to a very easy and rapid process, and at the same time greatly simplified the apparatus. Observers stationed at the two telescopes C and D align them with the distant object, when a third observer instantly reads the range from the galvanometer, which is provided with a scale suitably marked in linear units, such as yards. If, however, the angle ABT is not a right angle, then the factor sin ABT must be taken into consideration in solving the formula $$AT = \frac{AB \times \sin ABT}{\sin ATB}$$

or, in other words, the observer at the galvanometer may simply multiply the range indication by the sin ABT numerically expressed, in order to reduce the indicated range to the true range. The angle ABT is observed directly on the arc F.

In the foregoing demonstration it is assumed that the resistance in the circuit remains constant, or, in other words, remains the same as it is when the two telescopes are parallel to one another and stand in the positions C D, touching the middle parts of their arcs; but, as a matter of fact, this resistance does not remain the same when the telescopes move to positions nearer the extremities of the arcs. To illustrate: If the resistance of the circuit is a certain amount with the telescopes in the position C D, it will be less when the telescopes are turned in the position C' D'. Now, the variation of resistance due to this change of position will affect the total resistance in circuit to an extent depending upon its ratio to the resistance of the whole circuit, and, consequently, if that ratio be made very small, as it easily may be by simply introducing a high resistance in the battery-loop at i, between the points A and B, then, inasmuch as the variation in resistance due to change in position of the telescopes may thus be rendered inappreciable, the total resistance of the circuit may be taken as constant, so that despite the fact that the angle ABT differs from a right angle the deflection of the galvanometer, as before, will remain practically constant for any given angle ATB.

I am aware that if the high resistance before mentioned be not put in the battery-loop, then the decrease in resistance due to change in position of the telescopes from the middle point of their arcs toward the extremities of the arcs may bear a considerable ratio to the resistance of the whole circuit; and as this decrease in resistance will be attended by corresponding increase in current-strength it follows that proportionately greater deflections of the galvanometer will follow for any given angle ATB, so that consequently the ranges indicated by the galvanometer will be less than those which would have been shown had the high resistance been put in the battery-loop; and if the resistance of the battery-loop between A and B is extremely small with relation to the rest of the circuit, the decreasing resistance of the whole circuit due to change in position of the telescopes may become very large, and this result may be intensified if the members a b c d, connecting the arcs, are connected to those arcs at points less than ninety degrees from the middle points of those arcs. If, for instance, these wires were connected to the arcs at points eighty-one degrees removed from the middle points, and if the resistance in the battery-loop were one-tenth of the arc of eighty-one degrees, then when both telescopes were moved to positions sixty degrees from the middle points, the resistance of the whole circuit would be only about half of what it was when the telescopes were at the middle parts or the positions C D. Consequently, for any given relative angular displacement of the telescopes occurring sixty degrees away from the middle points of the arcs, the corresponding deflection of the galvanometer would be about twice as great as if the same relative angular displacement occurred when the telescopes were at the middle points of the arcs, so that the range indicated in the latter case would be about half as great as in the former; but it will be observed that if the telescope D, for instance, were sixty degrees removed from the central position, the angle ABT would be thirty degrees, and its sine would be one-half, so that the range-indication for any given angle ATB would be only one-half of what it would be with the same angle ATB when the telescope at D' is in its middle position. In other words, the fact of the decreased resistance caused in the circuit as the telescopes move away from the middle position tends to automatically make the very correction for the sine of ABT which ought to be introduced because the telescope no longer stands at ninety degrees to the base-line. It is not asserted here that this correction is mathematically exact. I am merely pointing out the phenomena which would occur when the telescopes are pointing at objects at small angles to the base-line, and showing how the reading of the galvanometer can be depended upon to show at once the approximately true range, with the corrections above indicated.

In the above the resistance of the galvanometer has been neglected, and it has been assumed that the electro-motive force and internal resistance of the battery, and the resistances of the various contacts remain constant. While this is not theoretically true, I have found that by using storage-batteries and by making the contacts carefully no appreciable error is introduced.

Careful experiments with my range-finder at sea show that the errors of observation are much greater than those of the instrument itself, and for this work, where precise measurements are not required, but quick reading is essential, the errors above mentioned need not be considered.

In the case where the resistance of the circuit is made small it will not be necessary under ordinary conditions to make both the correction for sine ABT and the correction for the increase of current due to the object being at an angle to the base-line; but since these two corrections are in the opposite sense and can be made approximately equal, it is sufficiently accurate for practical purposes to take the uncorrected reading of the galvanometer.

It has been assumed that the angle ATB is so small that its sine may be considered as proportional to the angle, and also that the deflection of the galvanometer for any angle ATB is approximately proportional to the current-strength in the said circuit, and the fall in potential per unit length in the arcs.

I claim—

1. The improvement in the art of finding the range of a distant object, which consists in determining a fractional portion of a conducting-body bearing in length a ratio to the angle included between two lines of sight directed upon a distant object and simultaneously causing a disturbance in an electrical balance including said body in its circuit proportional to the resistance of said fractional portion, and second, observing the difference in potential in the said circuit due to said disturbance.

2. The improvement in the art of finding the range of a distant object, which consists in determining a fractional portion of a conducting-body bearing in length a ratio to the angle included between two lines of sight directed upon a distant object and simultaneously causing a disturbance in an electrical balance including said body in its circuit proportional to the resistance of said fractional portion, and second, reading directly from the suitably-marked scale of an electrical measuring-instrument constructed to measure the amount of said disturbance, the range corresponding to said angle between the lines of sight.

BRADLEY ALLAN FISKE.

Witnesses:
JAMES S. GREVES,
M. BOSCH.